United States Patent
Bhosale et al.

(10) Patent No.: US 11,643,155 B2
(45) Date of Patent: May 9, 2023

(54) IDLER WEIGHT FOR DRIVE TRACK ASSEMBLY

(71) Applicant: DEERE & COMPANY, Moline, IL (US)

(72) Inventors: Digvijay A. Bhosale, Pune (IN); Samir Mahadik, Pune (IN); Benjamin J. Heimbuch, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 686 days.

(21) Appl. No.: 16/739,215

(22) Filed: Jan. 10, 2020

(65) Prior Publication Data

US 2021/0214026 A1    Jul. 15, 2021

(51) Int. Cl.
| | |
|---|---|
| *B62D 55/08* | (2006.01) |
| *B62D 55/14* | (2006.01) |
| *B62D 55/10* | (2006.01) |
| *B62D 55/06* | (2006.01) |
| *B62D 55/15* | (2006.01) |
| *B62D 49/08* | (2006.01) |

(52) U.S. Cl.
CPC ........... *B62D 55/08* (2013.01); *B62D 49/085* (2013.01); *B62D 55/06* (2013.01); *B62D 55/10* (2013.01); *B62D 55/14* (2013.01); *B62D 55/15* (2013.01)

(58) Field of Classification Search
CPC ...... B62D 55/08; B62D 49/085; B62D 55/06; B62D 55/10; B62D 55/14; B62D 55/15
See application file for complete search history.

(56) References Cited

U.S. PATENT DOCUMENTS

| | | | |
|---|---|---|---|
| 1,668,778 A | 5/1928 | Menningen | |
| 2,859,065 A | 11/1958 | Darby | |
| 3,068,711 A | 12/1962 | Even | |
| 3,993,356 A * | 11/1976 | Groff | B62D 55/0966 |
| | | | 305/136 |
| D298,632 S | 11/1988 | Grawey | |
| 6,062,662 A * | 5/2000 | Witt | B62D 55/04 |
| | | | 305/195 |
| 6,739,678 B2 | 5/2004 | Moebs | |
| 6,968,914 B2 | 11/2005 | Tucker | |
| 7,370,918 B2 | 5/2008 | Tucker | |
| 7,591,515 B2 | 9/2009 | Brazier | |
| 7,597,161 B2 | 10/2009 | Brazier | |
| 8,746,815 B2 | 6/2014 | Reshad et al. | |
| D709,527 S | 7/2014 | Meyer | |
| D736,284 S | 8/2015 | Maurer | |

(Continued)

FOREIGN PATENT DOCUMENTS

| | | |
|---|---|---|
| EP | 2736794 B1 | 9/2016 |
| JP | S63122101 U | 8/1988 |

OTHER PUBLICATIONS

German Search Report issued in application No. DE102020215482.1, dated Aug. 12, 2021, 10 pages.

*Primary Examiner* — Jacob D Knutson
(74) *Attorney, Agent, or Firm* — Taft Stettinius & Hollister LLP; Stephen F. Rost

(57) ABSTRACT

A work machine may include an drive frame, a drivable track coupled to the drive frame, an idler wheel coupled to the drive frame to facilitate movement of the drivable track, and a wheel weight coupleable to the idler wheel. The wheel weight may be coupled to the idler wheel without removing the idler wheel from the drive frame.

19 Claims, 8 Drawing Sheets

(56) References Cited

U.S. PATENT DOCUMENTS

| | | |
|---|---|---|
| D739,444 S | 9/2015 | Meyer |
| D762,140 S | 7/2016 | Simula |
| D787,394 S | 5/2017 | Hammer |
| 9,663,918 B2 | 5/2017 | Vik et al. |
| 9,884,662 B2 | 2/2018 | Eavenson, Sr. et al. |
| 9,902,441 B2 | 2/2018 | Buchanan et al. |
| D828,419 S | 9/2018 | de Lore |
| 10,155,537 B2 | 12/2018 | Eavenson, Sr. et al. |
| 10,737,719 B2 | 8/2020 | Johnson |
| 2002/0130552 A1 | 9/2002 | Juncker |
| 2006/0125318 A1 | 6/2006 | Soucy |
| 2008/0150355 A1 | 6/2008 | Breton |
| 2012/0153712 A1 | 6/2012 | Brazier |
| 2012/0161511 A1 | 6/2012 | Brazier |
| 2013/0026819 A1 | 1/2013 | Reshad |
| 2014/0001825 A1 | 1/2014 | Hakes |
| 2014/0091616 A1 | 4/2014 | Joseph Xavier |
| 2015/0321710 A1 | 5/2015 | Zuchoski |
| 2015/0314817 A1* | 11/2015 | Hobe .................. B62D 55/088 |
| | | 305/136 |
| 2016/0052569 A1 | 2/2016 | Buchanan |
| 2016/0114840 A1 | 4/2016 | L'Herault |
| 2017/0233018 A1* | 8/2017 | Buchanan .............. B62D 55/02 |
| | | 305/125 |

\* cited by examiner

IDLER WEIGHT FOR DRIVE TRACK ASSEMBLY

FIELD OF THE DISCLOSURE

The present disclosure relates to machinery with a drive track assembly, and more particularly to a wheel weight for use with an idler wheel of the drive track assembly.

BACKGROUND

Work machines and in particular agricultural work machines continue to grow in size or change with regard to their weight distribution to accommodate operations of differing scale and complexity. This is especially true as more efficient and light weight components are designed for such machines. Challenges exist in obtaining appropriate weight distribution and ballast. Additionally, different applications of a work machine may require variable weight distribution and ballast, which may be difficult to achieve with the existing components of a conventional work machine. Adding new components to improve weight distribution and ballast may also present challenges in the industry, not only in terms of aesthetics, but also because it may be desirable for any additional component to be positioned within the existing footprint of a conventional work machine. What is need therefore, is a component, system, or method for varying weight distribution and ballast of a work machine in an efficient, easy to use manner with minimal increase to the existing footprint of a conventional work machine.

SUMMARY

In an illustrative embodiment, a work machine comprises: a drive frame; a drivable track coupled to the drive frame; an idler wheel coupled to the drive frame; and a wheel weight removably coupled to the idler wheel.

In some embodiments, the work machine further comprises: a first plurality of fasteners that couples the idler wheel to the drive frame; and a second plurality of fasteners configured to removably couple the wheel weight to the idler wheel. In some embodiments, each fastener of the first plurality of fasteners is spaced apart from the wheel weight when the wheel weight is coupled to the idler wheel. The second plurality of fasteners cooperates with the first plurality of fasteners to couple the idler wheel to the drive frame when the wheel weight is coupled to the idler wheel. In some embodiments, each fastener included in the first plurality of fasteners has a first length; and each fastener included in the second plurality of fasteners has a second length greater than the first length.

In some embodiments, when the wheel weight is coupled to the idler wheel, the first plurality of fasteners and the second plurality of fasteners are arranged to form a circle that is concentric with the idler wheel. In some embodiments, the wheel weight includes a central axis and a plurality of wedges arranged about the central axis; and each wedge of the plurality of wedges includes radially outer end and a radially inner end that is narrower than the radially outer end and arranged between the central axis and the radially outer end. In some embodiments, each of the plurality of wedges includes an aperture defined in the radially inner end thereof, and each aperture is sized and shaped to receive a fastener of the second plurality of fasteners.

In some embodiments, the idler wheel includes a plurality of slots, and each slot of the plurality of slots is defined between a pair of wedges included in the plurality of wedges. In some embodiments, each slot is sized to receive a fastener of the first plurality of fasteners when the wheel weight is coupled to the idler wheel.

In another illustrative embodiment, a work machine comprises: a drive frame; a drivable track coupled to the drive frame; an idler wheel coupled to the drive frame; an idler wheel hub coupled to: (i) the drive frame via a drive shaft, and (ii) to the idler wheel via a first plurality of fasteners; and a wheel weight removably coupled to the idler wheel via a second plurality of fasteners.

In some embodiments, the second plurality of fasteners cooperates with the first plurality of fasteners to couple the idler wheel to the idler wheel hub when the wheel weight is coupled to the idler wheel; and the first plurality of fasteners does not cooperate with the second plurality of fasteners to couple the wheel weight to the idler wheel.

In some embodiments, the idler wheel includes an outer surface having a sloped contour; and the wheel weight includes an outer surface, an inner surface opposite the outer surface, and a side wall extending between the inner surface and the outer surface at an angle that approximates the sloped contour of the outer surface of the idler wheel. In some embodiments, the wheel weight includes an opening extending through the inner surface and the outer surface of the wheel weight, and the idler wheel hub extends through the opening. In some embodiments, the wheel weight includes: a plurality of wedges, wherein each wedge of the plurality of wedges narrows to an inner end that defines a boundary of the opening, and a plurality of slots, wherein each slot of the plurality of slots is defined by side walls of the wedges and opens into the opening of the wheel weight.

In another illustrative embodiment, a method of adjusting weight distribution for a work machine including an idler wheel secured to a drive frame includes: providing a wheel weight configured to be coupled to the idler wheel, the wheel weight having a plurality of slots and a plurality of apertures formed therein; aligning the plurality slots of the wheel weight with a first plurality of fasteners which are securing the idler wheel to the drive frame; aligning a second plurality of fasteners with the plurality of apertures formed in the wheel weight and with a plurality of apertures formed in the idler wheel; and inserting the second plurality of fasteners into the plurality of apertures formed in the wheel weight and into the plurality of apertures formed in the idler wheel to fasten the wheel weight to the idler wheel.

In some embodiments, the method includes, subsequent to the first aligning step recited above, removing a third plurality of fasteners from the plurality of apertures formed in the idler wheel. In some embodiments, the work machine further includes an idler wheel hub coupled to the idler wheel and the drive frame. The method further includes: aligning the second plurality of fasteners with a plurality of apertures formed in the idler wheel hub; and inserting the second plurality of fasteners into the plurality of apertures formed in the idler wheel hub to further secure the idler wheel to the drive frame and to simultaneously fasten the wheel weight to the idler wheel.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
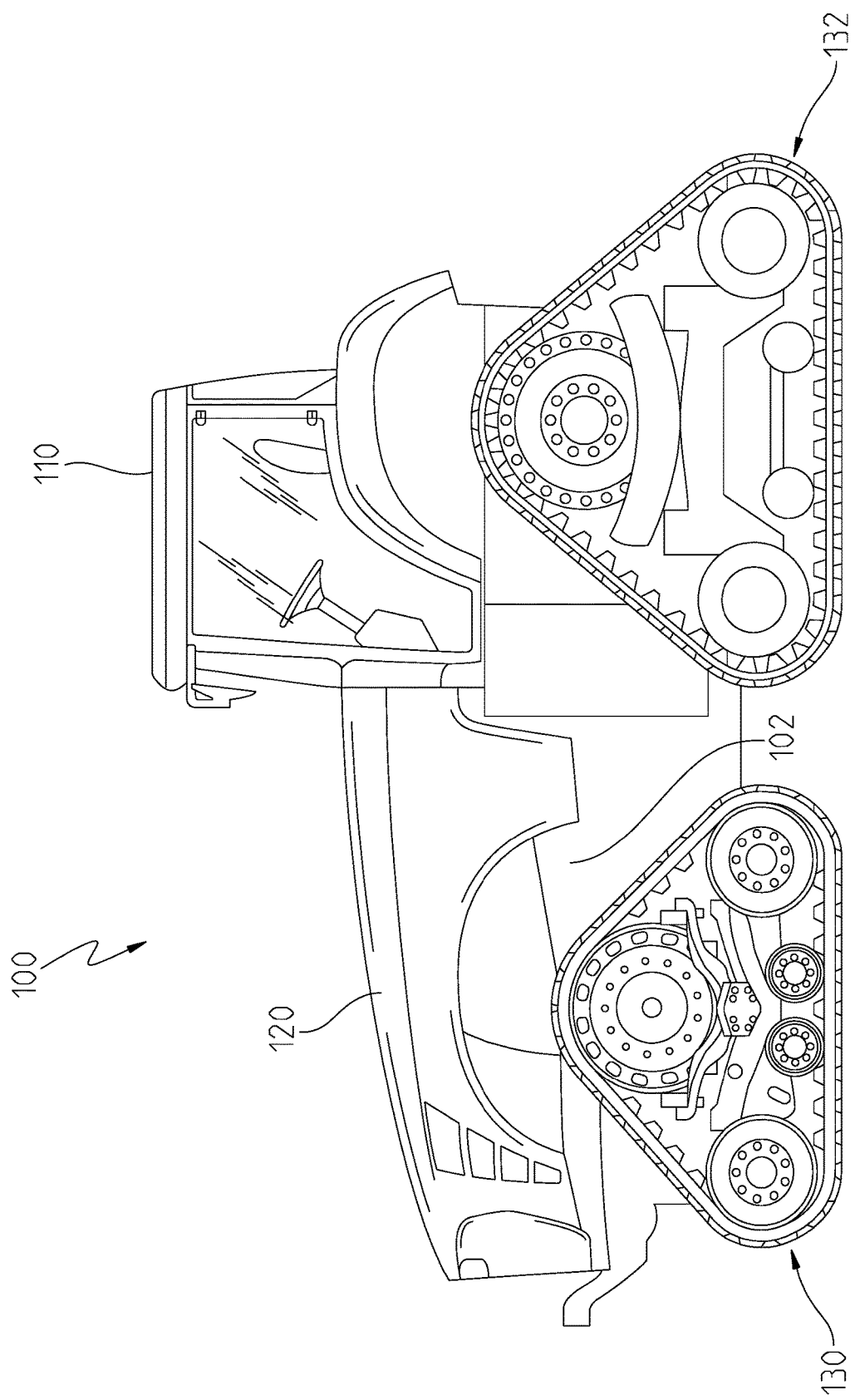
FIG. 1 illustrates a side view of a work machine with drivable tracks.

FIG. 1 illustrates an exemplary work machine 100, in this example a tractor, including a tractor frame 102, an operator cab 110, an engine compartment that holds an engine 120, front drive track assemblies 130 and rear drive track assemblies 132. FIG. 1 only shows the left side of the vehicle 100 with one front track drive assembly 130 and one rear track drive assembly 132; the right side of the vehicle 100 also includes one front track drive assembly 130 and one rear track drive assembly 132. The tractor frame 102 supports the operator cab 110 and engine 120. The front and rear track drive assemblies 130, 132 support the tractor frame 102 above the ground, and provide propelling force to the vehicle 100. The operator cab 110 provides the operator with a clear view of the area being worked by the vehicle 100. The operator cab 110 includes controls for the operator to control the engine 120 and the track drive assemblies 130, 132.

Figure 2:
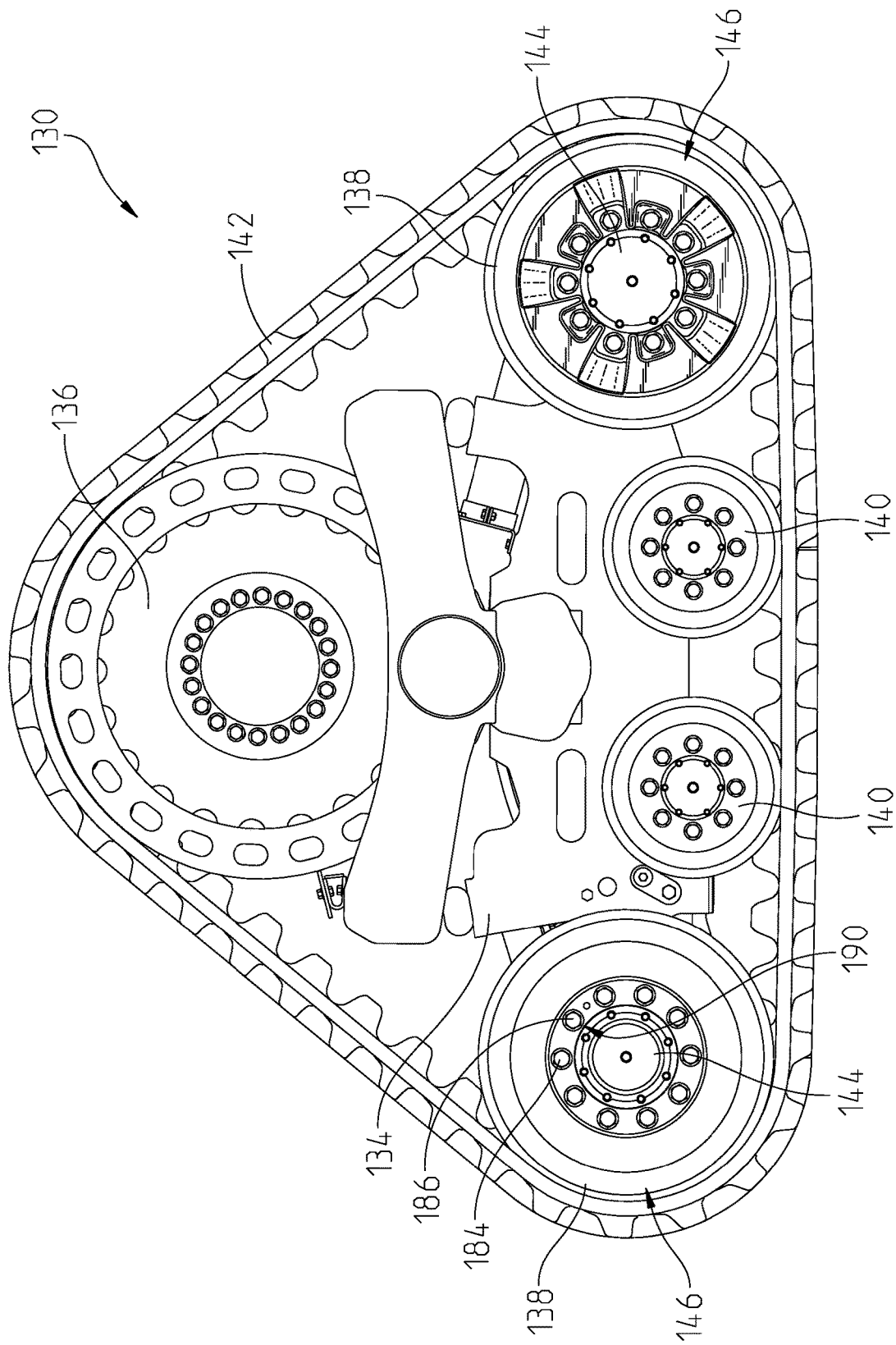
FIG. 2 illustrates a side view of a drive track assembly of the work machine shown in FIG. 1.

FIG. 2 illustrates a side view of a drive track assembly 130. The drive track assembly 130 includes a drive frame 134, a drive wheel 136, idler wheels 138, mid rollers 140, and drivable track 142. The idler wheels 138 and mid rollers 140 are connected to the drive frame 134 to support the work machine 100 and facilitate movement of the work machine 100 along the ground. The drivable track 142 moves about the drive wheel 136, the idler wheels 138, and the mid rollers 140. The drive frame 134 supports the components of the drive track assembly 130. The drive wheel 136 drives the drivable track 142 clockwise or counterclockwise around the drive wheel 136, idler wheels 138, and mid rollers 140 to propel the work machine 100. In some embodiments, the drive track assembly 130 includes an idler wheel hub 144. The idler wheel hub 144 is coupled to the drive frame 134 via a drive shaft 145 (see FIGS. 6 and 7). Additionally, the idler wheel hub 144 is coupled to the idler wheel 138 via fasteners, which will be described in greater detail below. As shown in FIG. 2, each idler wheel 138 has an outer surface 146. The outer surface 146 has a sloped contour such that an outer side of each idler wheel 138 has a concave shape.

Figure 5:
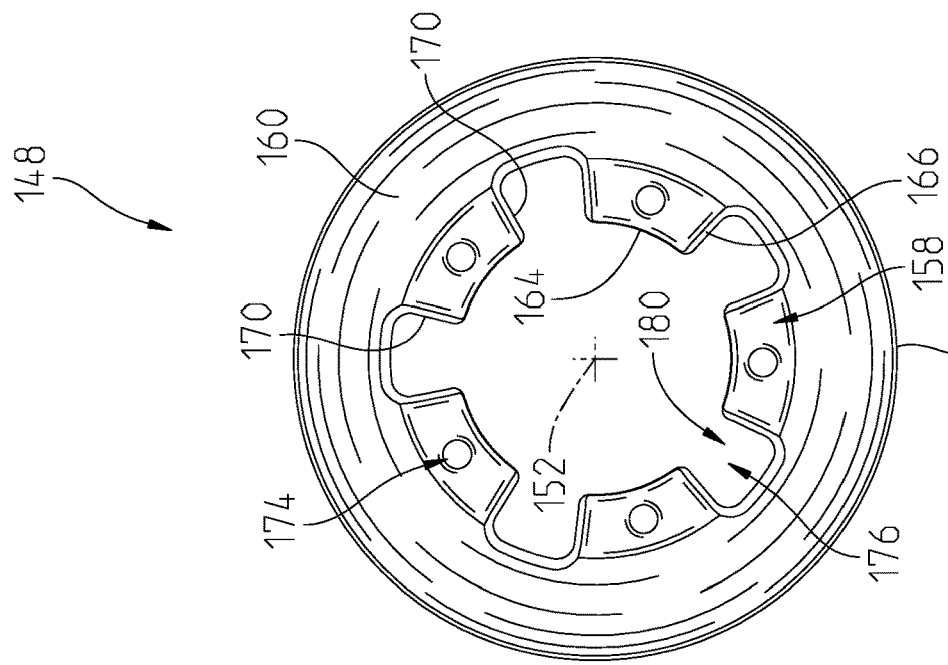
FIG. 5 illustrates a back view of the wheel weight of FIG. 3.
Figure 4:
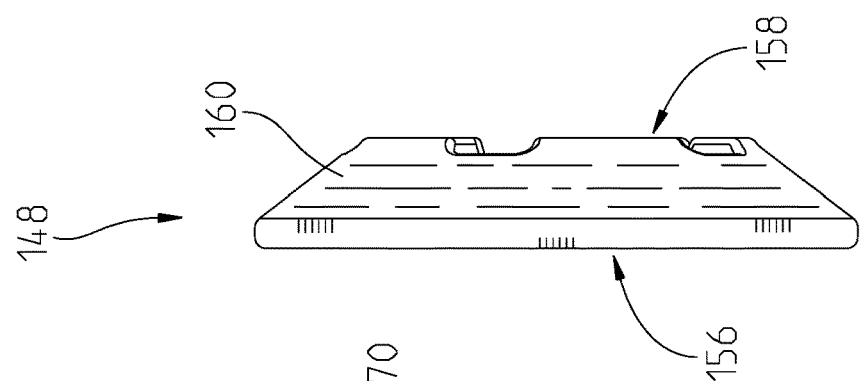
FIG. 4 illustrates a side view of the wheel weight of FIG. 3.
Figure 3:
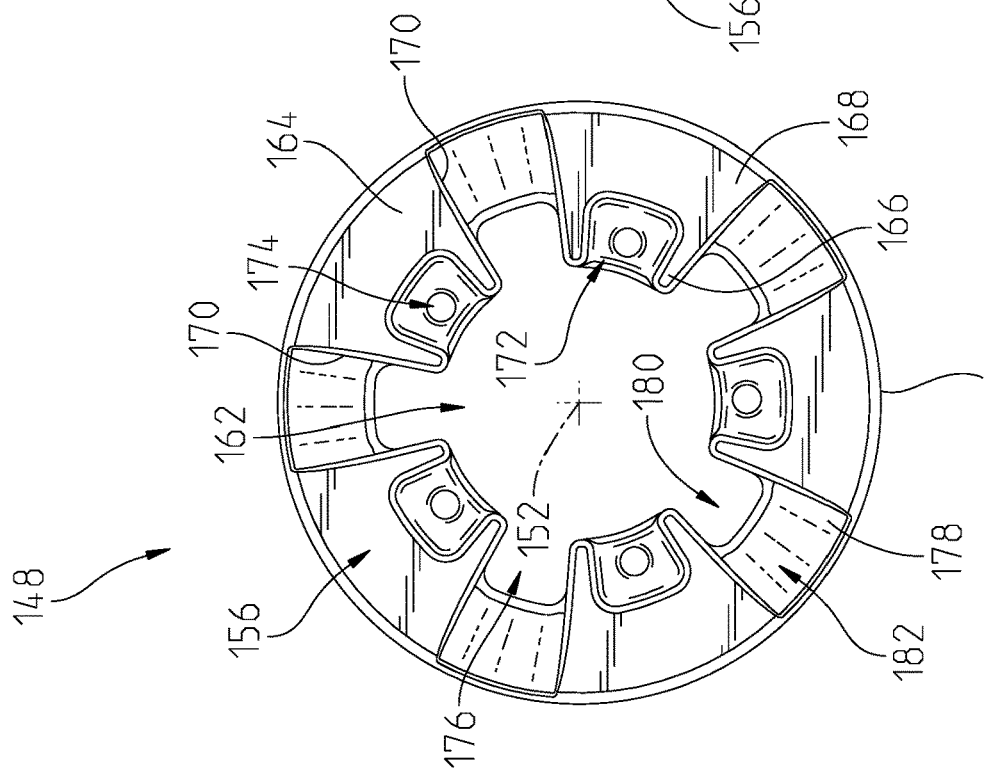
FIG. 3 illustrates a front view of a wheel weight configured to be coupled to an idler wheel of the drive track assembly.

FIGS. 3, 4, and 5 illustrate various views of a wheel weight 148 that is configured to be coupled to an idler wheel 138 of the work machine 100. The wheel weight 148 may have any weight suitable for appropriately balancing or adjusting the weight distribution or ballast of the work machine 100. In the illustrative embodiment shown in FIGS. 3, 4, and 5, the wheel weight 148 is circular and includes an outer rim 150 extending around a central axis 152. The wheel weight 148 includes an outer surface 156 shown in FIG. 3, an inner surface 158 shown in FIG. 5, and a side wall 160 extending between the inner surface 158 and the outer surface 156. The side wall 160 is a sloped surface and matches the sloped contour of the outer surface 146 of the idler wheel 138. In other words, the side wall 160 extends between the inner surface 158 and the outer surface 156 at an angle that approximates the sloped contour of the outer surface 146 of the idler wheel 138. The relationship between the slope surface of side wall 160 and the of the sloped contour of the outer surface 146 the allows the wheel weight 148 to be positioned at least partially within the existing footprint of the work machine 100 when the wheel weight 148 is coupled to the idler wheel 138. The wheel weight 148 is formed to include an opening 162 that extends through the inner surface 158 and the outer surface 156 of the wheel weight 148.

Referring now to FIG. 3, the wheel weight 148 includes a plurality of wedges 164 spaced apart from one another and arranged about the central axis 152. In the illustrative embodiment, each wedge 164 is spaced apart equidistant from the adjacent wedges 164. In addition to providing aesthetic value, the wedge shape and equidistant spacing provides balanced rotation and common wear patterns about the wheel weight 148 and other components nearby. Each wedge 164 includes a radially inner end 166 and a radially outer end 168. In some embodiments, the radially outer end 168 of the wedge 164 defines a portion of the outer rim 150 of the wheel weight 148. Each wedge 164 narrows as it extends from the radially outer end 168 to the radially inner end 166. As such, the radially inner end 166 is narrower than the radially outer end 168 and is arranged between the central axis 152 and the radially outer end 168. In some embodiments, the radially inner end 166 of the wedge 164 defines a boundary of the opening 162.

Referring still to FIG. 3, each wedge 164 further includes a pair of side walls 170. The side walls 170 span the lengths of the radially outer and radially inner ends 166, 168 of the wedge 164. Each wedge 164 further defines a pocket 172 that is depressed or set in from the outer surface 156 of the wedge 164. The pocket 172 is positioned between the side walls 170 of the wedge 164 and defined in the radially inner end 166 of the wedge 164. In the illustrative embodiment, the pocket 172 is u-shaped and enclosed on three sides by interior walls of the wedge 164, with a fourth side being open to the opening 162 defined in the wheel weight 148. In addition to providing aesthetic value, the shape of the pocket 172 provides access to and protection for a fastener that may be housed in the pocket 172 as described in greater detail below. Each wedge 164 is formed to include an aperture 174 defined in the pocket 172 (and therefore defined in the radially inner end 166) of the wedge 164.

The wheel weight 148 is further formed to include a plurality of channels 176 arranged about the central axis 152. Each channel 176 is defined between a pair of wedges 164. Specifically, side walls 170 of adjacent wedges 164 cooperate to define each channel 176. Each channel 176 extends from the outer rim 150 of the wheel weight 148 to the opening 162 of the wheel weight 148. In the illustrative embodiment, each channel 176 is equidistant from the adjacent channels 176, and each channel 176 is wedge-shaped. In addition to providing aesthetic value, the wedge shape and equidistant spacing provides balanced rotation and common wear patterns about the wheel weight 148 and other components nearby.

Each channel 176 includes a ramped block 178 and a slot 180 positioned within the channel 176. The ramped block 178 includes a sloped outer surface 182 that extends from the outer rim 150 of the wheel weight 148 radially inward to the slot 180. An interior wall of the ramped block 178 cooperates with portions of the side walls 170 of adjacent wedges 164 to define the slot 180. In the illustrative embodiment, the slot 180 is u-shaped and enclosed on three sides as described above, with a fourth side being open to the opening 162 defined in the wheel weight 148. In addition to providing aesthetic value, the shape of the slot 180 provides access to and protection for a fastener that may be housed in the slot 180 as described in greater detail below. In the illustrative embodiment, the shape of each slot 180 matches the shape of each pocket 172. In addition to providing aesthetic value, the matching aspect and the arrangement of the slots 180 and pockets 172 provides balanced rotation and common wear patterns about the wheel weight 148 and other components nearby.

Figure 6:
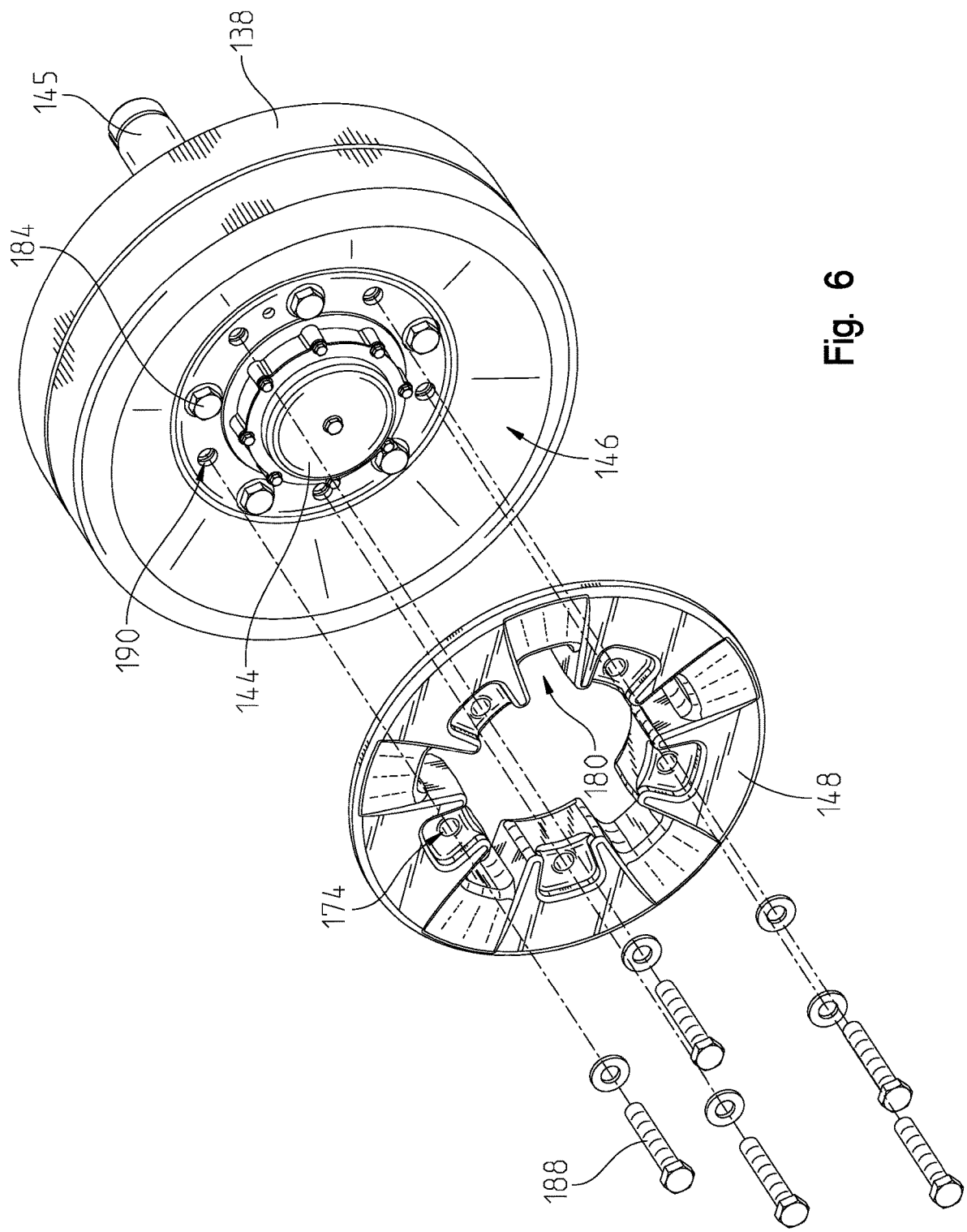
FIG. 6 illustrates an exploded front perspective view of the wheel weight and the idler wheel.
Figure 7:
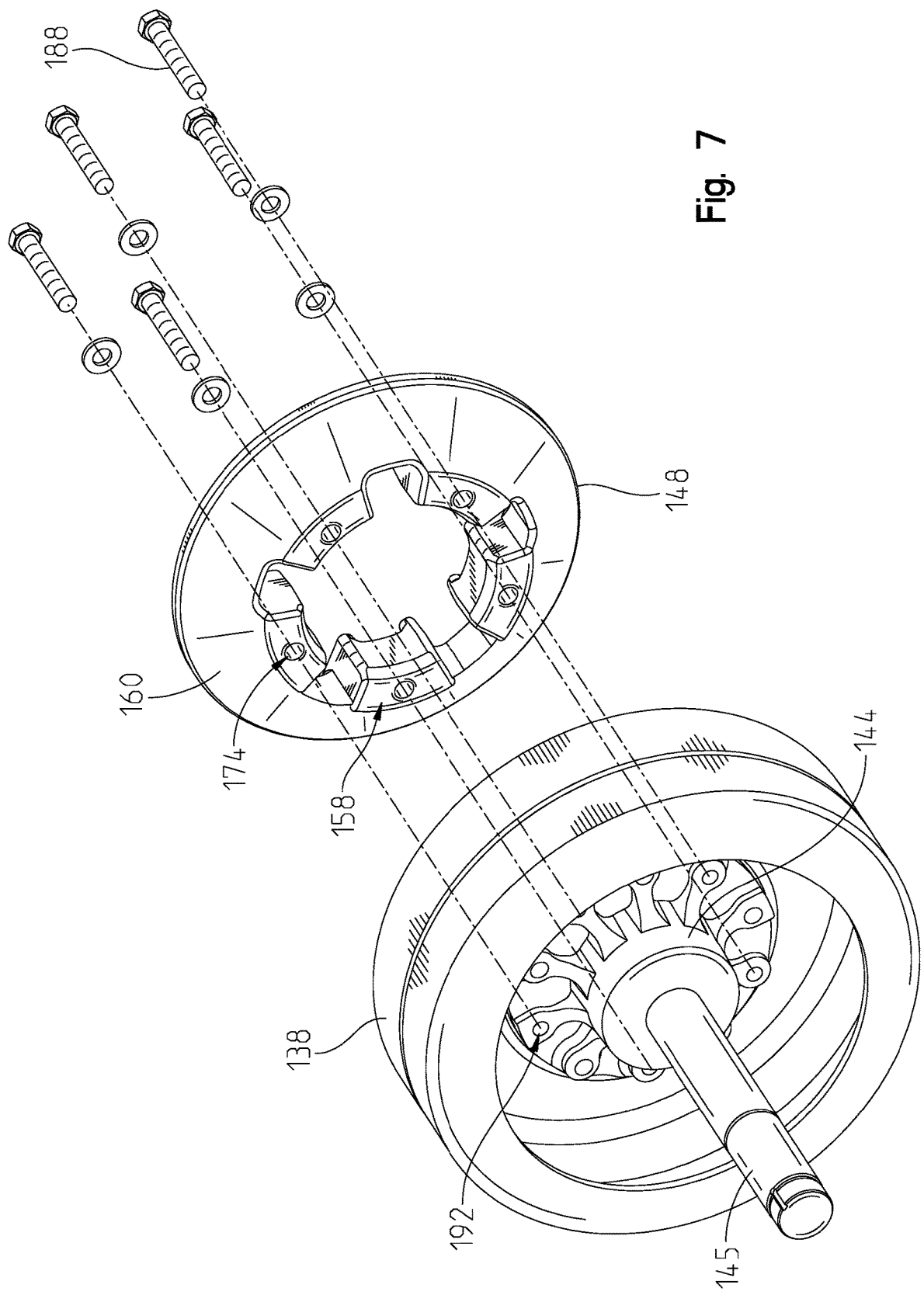
FIG. 7 illustrates an exploded back perspective view of the wheel weight and the idler wheel.

FIGS. 6 and 7 show exploded views of the idler wheel 138 and the wheel weight 148, and will be used to explain a method of adjusting weight distribution for the work machine 100. In FIG. 6, the idler wheel 138 is shown separate from the drive frame 134 (the drive frame 134 has been omitted for simplicity); however, it should be appreciated that in use the wheel weight 148 may be fastened to or removed from the idler wheel 138 without detaching the idler wheel 138 from the drive frame 134. Specifically, as suggested by FIGS. 6 and 7, while the wheel weight 148 is being fastened to or removed from the idler wheel 138, the idler wheel 138 remains coupled to the idler wheel hub 144 and thereby the drive shaft 145, which is ultimately coupled to the drive frame 134.

As shown in FIGS. 6 and 7, the idler wheel 138 and the idler wheel hub 144 are secured to one another via a first plurality of fasteners 184 and an independent plurality of fasteners 186 (fasteners 186 are shown in FIG. 2). The independent plurality of fasteners 186 is sometimes referred to as a third plurality of fasteners 186. As suggested by FIG. 6, the first plurality fasteners 184 continuously secures the idler wheel 138 to the wheel hub 144 (and ultimately to the drive frame 134). As suggested by FIGS. 2, 6 and 7, the third plurality of fasteners 186 extends through a plurality of apertures 190 of the idler wheel 138 and through a plurality of apertures 192 of the idler wheel hub 144 to secure the idler wheel 138 to the idler wheel hub 144 (and ultimately to the drive frame 134).

The wheel weight 148 is coupleable to the idler wheel 138 via a second plurality of fasteners 188. Prior to coupling the wheel weight 148 to the idler wheel 138, the third plurality of fasteners 186 may be removed from the idler wheel 138 and from the idler wheel hub 144. In FIGS. 6 and 7, the third plurality of fasteners 186 have already been removed and are therefore not shown.

In addition to the process described above, the method of adjusting weight distribution for the work machine 100 may include several additional steps as described in detail below. The plurality of the slots 180 of the wheel weight 148 is aligned with the first plurality of fasteners 184. Simultaneously, the plurality of apertures 174 formed in the wheel weight 148 is aligned with the now-exposed plurality of apertures 190 formed in the idler wheel 138. At this point, it should be appreciated that the plurality of apertures 174 are also aligned with the apertures 192 of the idler wheel hub 144, since the idler wheel 138 has remained secured to the idler wheel hub 144 throughout the method.

The method further includes aligning the second plurality of fasteners 188 with each of the pluralities of apertures 174, 190, and 192. The method further includes inserting the second plurality of fasteners 188 into each of the pluralities of apertures 174, 190, and 192 to (i) further secure the idler wheel 138 to idler wheel hub 144 (and thereby the drive frame 134) and (ii) simultaneously fasten the wheel weight 148 to the idler wheel 138.

Figure 8:
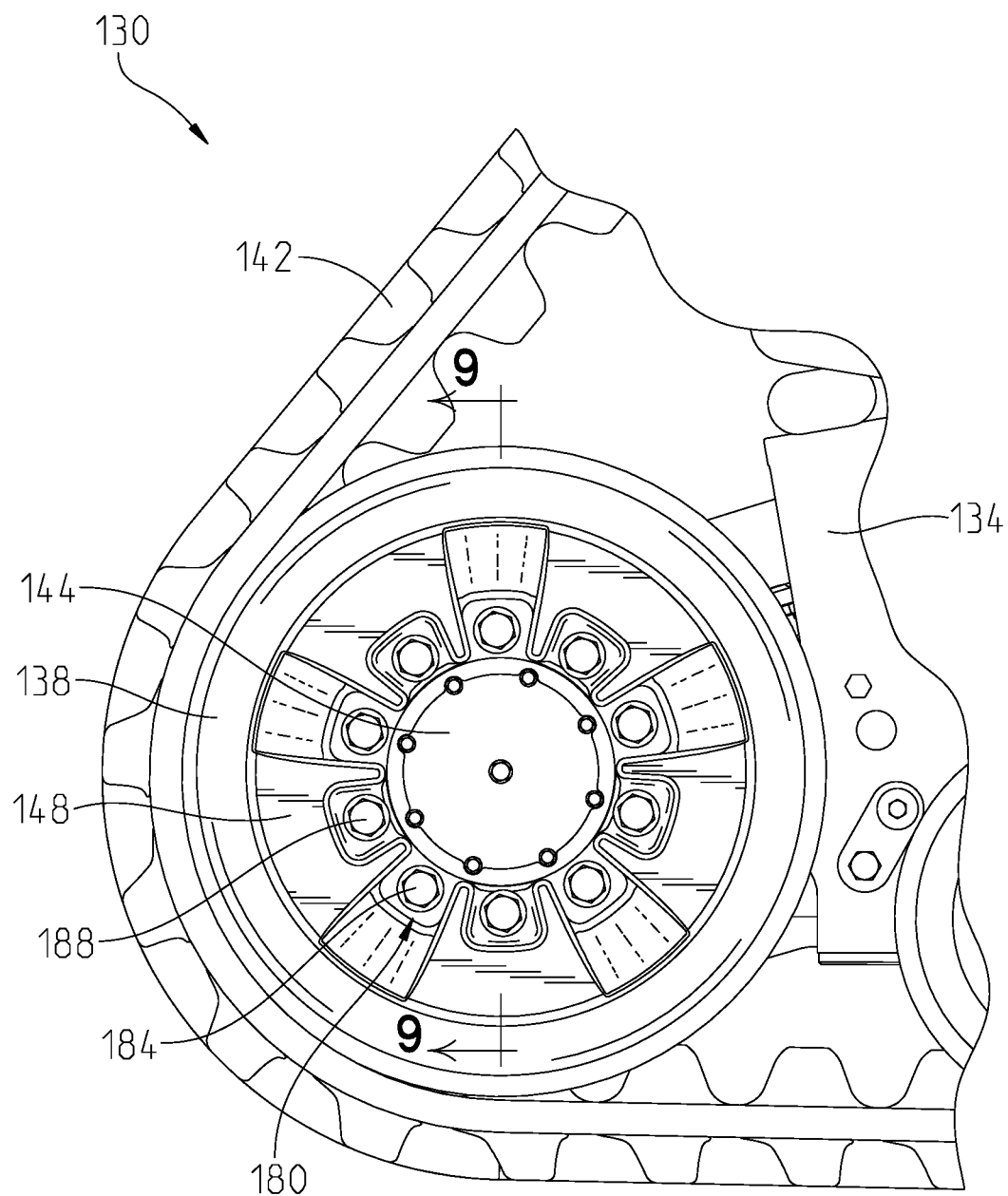
FIG. 8 illustrates a partial side view showing the wheel weight coupled to the idler wheel.

FIG. 8 shows the wheel weight 148 fastened to the idler wheel 138. It should be appreciated that when the wheel weight 148 is coupled to the idler wheel 138, each fastener included in the first plurality of fasteners 184 is positioned in a slot 180 of the wheel weight 148. As such, each fastener 184 is spaced apart from the wheel weight 148 (i.e. not in contact with the wheel weight 148). The second plurality of fasteners 188 cooperates with the first plurality of fasteners 184 to couple the idler wheel 138 to the idler wheel hub 144; however, the first plurality of fasteners 184 does not cooperate with the second plurality of fasteners 188 to couple the wheel weight 148 to the idler wheel 138.

Figure 9:
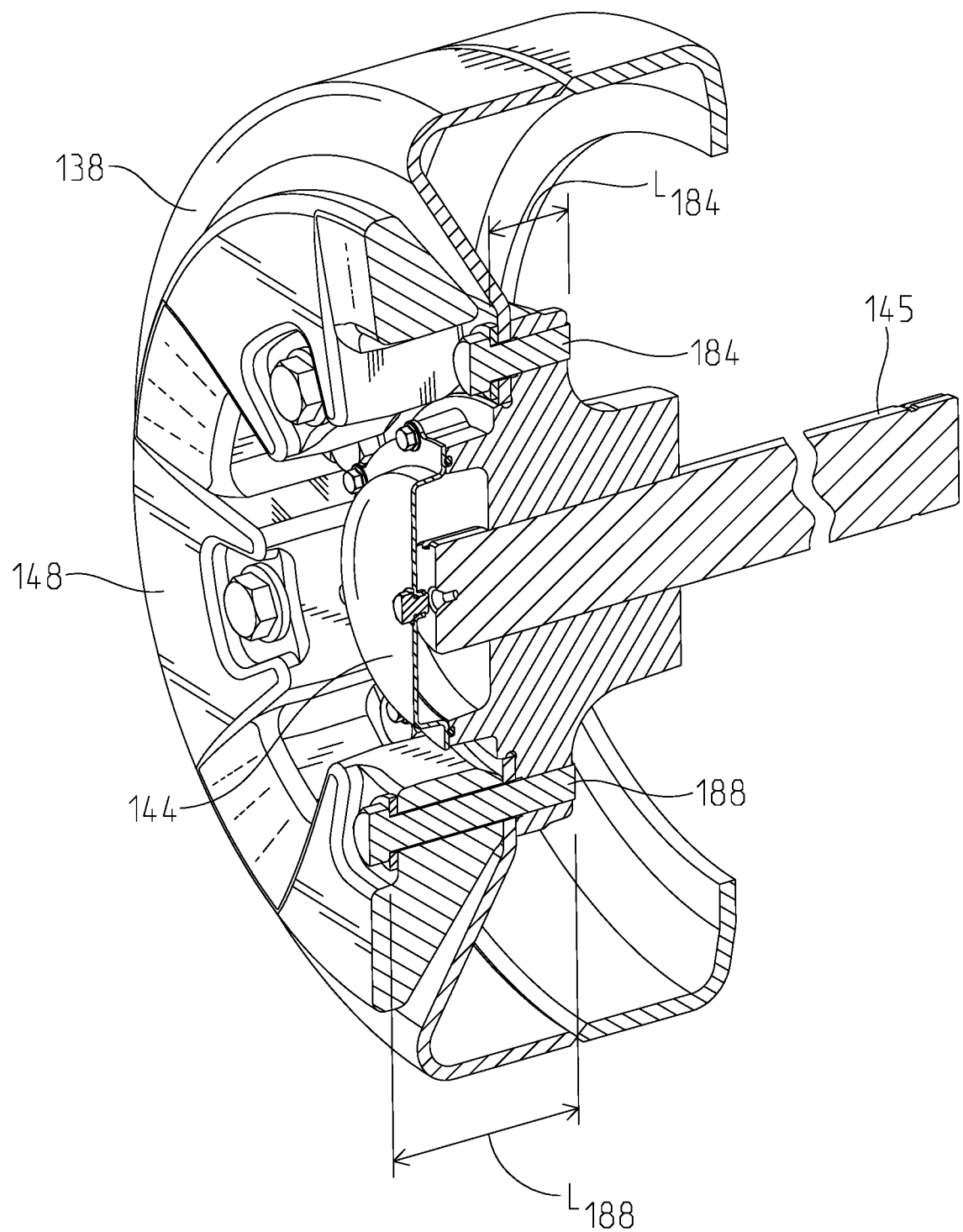
FIG. 9 illustrates a cross-section view of the wheel weight and idler wheel shown in FIG. 8.

Referring now to FIG. 9, a cross-section view of the wheel weight 148 fastened to the idler wheel 138 is shown. In the illustrative embodiment, each fastener included in the first plurality of fasteners 184 has a first length $L_{184}$, and each fastener included in the second plurality of fasteners 188 has a second length $L_{188}$ that is greater than the first length $L_{184}$. The greater length $L_{188}$ of each fastener 188 allows those fasteners 188 to (i) extend through the wheel weight 148 to fasten the wheel weight 148 to the idler wheel 138, and (ii) extend through idler wheel 138 and the wheel hub 144 to further secure the idler wheel 138 to idler wheel hub 144 as described above.

Figure 10:
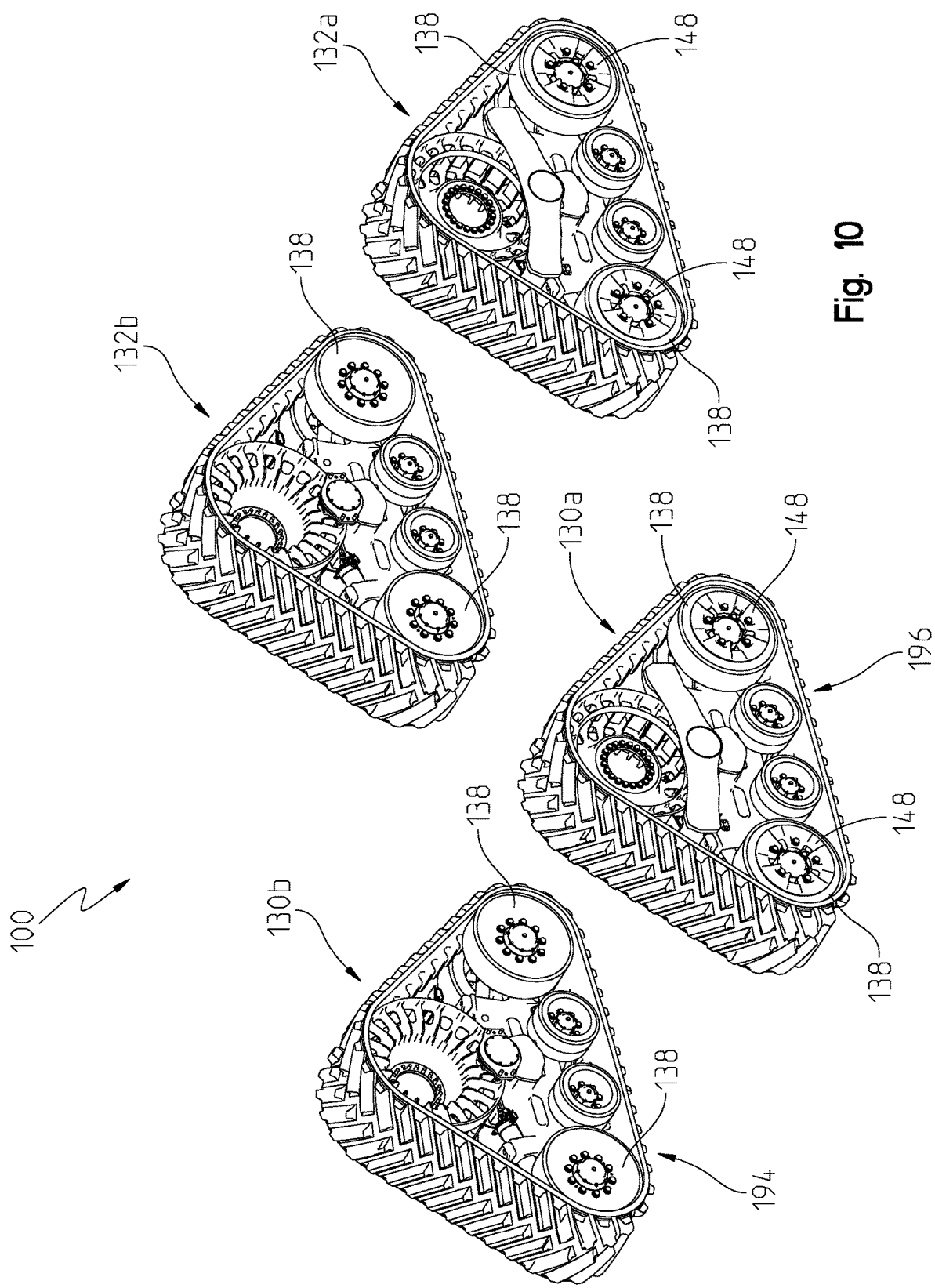
FIG. 10 illustrates a perspective view of four drive track assemblies as the drive track assemblies may be positioned in an exemplary work machine.

FIG. 10 illustratively shows, four drive track assemblies as those assemblies would be positioned on a work machine 100. As suggest by FIG. 10, wheel weights 148 may be fastened to each drive track assembly 130a, 130b, 132a, and 132b. Further, wheel weights 148 may be fastened to either or both of the front idler wheel 138 and the rear idler wheel 138 on any drive track assembly. FIG. 10 shows the inner side 194 the drive track assemblies 130b and 132b and the outer side 196 of drive track assemblies 130a and 132a. While wheel weights 148 are illustratively shown only on the outer side 196 of the drive track assemblies, it should be appreciated that wheel weights 148 may also be fastened to the inner side 194 of the drive track assemblies.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A work machine comprising:
a drive frame;
a drivable track coupled to the drive frame;
an idler wheel coupled to the drive frame; and
a wheel weight removably coupled to the idler wheel;
wherein the wheel weight includes a central axis and a plurality of wedges arranged about the central axis; and
wherein each wedge of the plurality of wedges includes a radially outer end and a radially inner end that is narrower than the radially outer end and arranged between the central axis and the radially outer end.

2. The work machine of claim 1, wherein the work machine further comprises:
a first plurality of fasteners that couples the idler wheel to the drive frame; and
a second plurality of fasteners configured to removably couple the wheel weight to the idler wheel.

3. The work machine of claim 2, wherein each fastener of the first plurality of fasteners is spaced apart from the wheel weight when the wheel weight is coupled to the idler wheel.

4. The work machine of claim 3, wherein the second plurality of fasteners cooperates with the first plurality of fasteners to couple the idler wheel to the drive frame when the wheel weight is coupled to the idler wheel.

5. The work machine of claim 4, wherein:
each fastener included in the first plurality of fasteners has a first length; and
each fastener included in the second plurality of fasteners has a second length greater than the first length.

6. The work machine of claim 2, wherein, when the wheel weight is coupled to the idler wheel, the first plurality of fasteners and the second plurality of fasteners are arranged to form a circle that is concentric with the idler wheel.

7. The work machine of claim 2, wherein:
each of the plurality of wedges includes an aperture defined in the radially inner end thereof, and each aperture is sized and shaped to receive a fastener of the second plurality of fasteners.

8. The work machine of claim 1, wherein the wheel weight includes a plurality of slots, and each slot of the plurality of slots is defined between a pair of wedges included in the plurality of wedges.

9. The work machine of claim 8, wherein each slot is sized to receive a fastener of the first plurality of fasteners when the wheel weight is coupled to the idler wheel.

10. A work machine comprising:
a drive frame;
a drivable track coupled to the drive frame;
an idler wheel coupled to the drive frame;
an idler wheel hub coupled to: (i) the drive frame via a drive shaft, and (ii) to the idler wheel via a first plurality of fasteners; and
a wheel weight removably coupled to the idler wheel via a second plurality of fasteners;
wherein the idler wheel includes an outer surface having a sloped contour; and
wherein the wheel weight includes an outer surface, an inner surface opposite the outer surface, and a side wall extending between the inner surface and the outer surface at an angle that approximates the sloped contour of the outer surface of the idler wheel.

11. The work machine of claim 10, wherein:
the second plurality of fasteners cooperates with the first plurality of fasteners to couple the idler wheel to the idler wheel hub when the wheel weight is coupled to the idler wheel; and
the first plurality of fasteners does not cooperate with the second plurality of fasteners to couple the wheel weight to the idler wheel.

12. The work machine of claim 10, wherein:
the wheel weight includes an opening extending through the inner surface and the outer surface of the wheel weight, and the idler wheel hub extends through the opening.

13. The work machine of claim 12, wherein the wheel weight includes:
a plurality of wedges, wherein each wedge of the plurality of wedges narrows to an inner end that defines a boundary of the opening, and
a plurality of slots, wherein each slot of the plurality of slots is defined by side walls of the wedges and opens into the opening of the wheel weight.

14. The work machine of claim 10, wherein each fastener of the first plurality of fasteners is spaced apart from the wheel weight when the wheel weight is coupled to the idler wheel.

15. The work machine of claim 10, wherein:
each fastener included in the first plurality of fasteners has a first length; and
each fastener included in the second plurality of fasteners has a second length greater than the first length.

16. The work machine of claim 10, wherein, when the wheel weight is coupled to the idler wheel, the first plurality of fasteners and the second plurality of fasteners are arranged to form a circle that is concentric with the idler wheel.

17. A method of adjusting weight distribution for a work machine including an idler wheel secured to a drive frame, the method comprising:
providing a wheel weight configured to be coupled to the idler wheel, the wheel weight having a plurality of slots and a plurality of apertures formed therein;
aligning the plurality slots of the wheel weight with a first plurality of fasteners which are securing the idler wheel to the drive frame;
aligning a second plurality of fasteners with the plurality of apertures formed in the wheel weight and with a plurality of apertures formed in the idler wheel; and
inserting the second plurality of fasteners into the plurality of apertures formed in the wheel weight and into the plurality of apertures formed in the idler wheel to fasten the wheel weight to the idler wheel.

18. The method of claim 17, further comprising:
subsequent to the first aligning step of claim 17, removing a third plurality of fasteners from the plurality of apertures formed in the idler wheel.

19. The method of claim 17, wherein the work machine further includes an idler wheel hub coupled to the idler wheel and the drive frame, and the method further comprises:
aligning the second plurality of fasteners with a plurality of apertures formed in the idler wheel hub; and
inserting the second plurality of fasteners into the plurality of apertures formed in the idler wheel hub to further secure the idler wheel to the drive frame and to simultaneously fasten the wheel weight to the idler wheel.

\* \* \* \* \*